US012603041B2

(12) United States Patent
Jeong et al.

(10) Patent No.: US 12,603,041 B2
(45) Date of Patent: Apr. 14, 2026

(54) DISPLAY PANEL AND ELECTRONIC DEVICE

(71) Applicant: WUHAN CHINA STAR OPTOELECTRONICS TECHNOLOGY CO., LTD., Wuhan (CN)

(72) Inventors: Jaehyeong Jeong, Wuhan (CN); Huilan Zhan, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 207 days.

(21) Appl. No.: 18/566,182

(22) PCT Filed: Oct. 31, 2023

(86) PCT No.: PCT/CN2023/128751
§ 371 (c)(1),
(2) Date: Dec. 1, 2023

(87) PCT Pub. No.: WO2025/076883
PCT Pub. Date: Apr. 17, 2025

(65) Prior Publication Data

US 2025/0118253 A1 Apr. 10, 2025

(30) Foreign Application Priority Data

Oct. 9, 2023 (CN) ........................ 202311302144.8

(51) Int. Cl.
*G09G 3/3208* (2016.01)

(52) U.S. Cl.
CPC ... *G09G 3/3208* (2013.01); *G09G 2300/0842* (2013.01); *G09G 2320/0233* (2013.01); *G09G 2320/0673* (2013.01)

(58) Field of Classification Search
None
See application file for complete search history.

(56) References Cited

U.S. PATENT DOCUMENTS

2023/0079286 A1 3/2023 Wang et al.
2024/0282254 A1* 8/2024 Lee ...................... G09G 3/2003

FOREIGN PATENT DOCUMENTS

CN 105976757 A 9/2016
CN 107369778 A 11/2017
(Continued)

OTHER PUBLICATIONS

International Search Report in International application No. PCT/CN2023/128751, mailed on Jun. 19, 2024.
(Continued)

*Primary Examiner* — Nicholas J Lee
(74) *Attorney, Agent, or Firm* — PV IP PC; Christopher S. Ruprecht; Wei Te Chung

(57) ABSTRACT

A display panel and an electronic device are disclosed. The display panel includes a panel body comprising a first sub-pixel and a second sub-pixel of different colors, and a driver chip electrically connected to the first sub-pixel and the second sub-pixel. The driver chip includes an adjustment module, configured to determine whether the first sub-pixel does not emit light and whether a plurality of second sub-pixels around the first sub-pixel emit light and to adjust an original gamma voltage of the first sub-pixel to generate a target gamma voltage when the first sub-pixel does not emit light and the plurality of second sub-pixels around the first sub-pixel emit light. The target gamma voltage is greater than the original gamma voltage.

20 Claims, 9 Drawing Sheets

(56) References Cited

FOREIGN PATENT DOCUMENTS

| | | | |
|---|---|---|---|
| CN | 113299242 | A | 8/2021 |
| CN | 115768158 | A | 3/2023 |
| KR | 20210134162 | A | 11/2021 |
| WO | 2022110124 | A1 | 6/2022 |

OTHER PUBLICATIONS

Written Opinion of the International Search Authority in International application No. PCT/CN2023/128751, mailed on Jun. 19, 2024.

* cited by examiner

2021

DISPLAY PANEL AND ELECTRONIC DEVICE

CROSS REFERENCE TO RELATED APPLICATION

This application is a US national phase application based upon an International Application No. PCT/CN2023/128751, filed on Oct. 31, 2023, which claims the priority of Chinese Patent Application No. 202311302144.8, entitled "DISPLAY PANEL AND ELECTRONIC DEVICE", filed on Oct. 9, 2023, the disclosures of which are incorporated herein by reference in its entirety.

FIELD OF THE DISCLOSURE

The present disclosure relates to a display technology, and more particularly, to a display panel and an electronic device.

BACKGROUND

Organic Light-Emitting Diode (OLED) display panels have the characteristics of light and thin, low energy consumption, high brightness, good light-emitting rate, high contrast, and bendability, and are widely used in TVs, computers, mobile phones, tablets and other fields.

However, in the light-emitting process of OLED display panels, due to the overlap of adjacent sub-pixel evaporation coating layers forms a leakage path, when a monochrome color picture is being displayed, the voltage difference between the anodes/cathodes of the adjacent non-light-emitting sub-pixel and the light-emitting sub-pixel is large. This results in a lateral leakage current, which leads to an abnormal display of a low brightness and a dark color.

Therefore, the conventional OLED display panel has the issue of poor uniformity and thus needs to be improved.

SUMMARY

One objective of an embodiment of the present disclosure is to provide a display panel and an electronic device to alleviate the issue of poor uniformity caused by the lateral leakage current.

One objective of an embodiment of the present disclosure is to provide a display panel and an electronic device to alleviate the issue of poor uniformity caused by the lateral leakage current.

According to an embodiment of the present disclosure, a display panel comprises:

- a panel body including a first sub-pixel and a second sub-pixel of different colors;
- a driver chip being electrically connected to the first sub-pixel and the second sub-pixel.

The driver chip comprises:

- an adjustment module configured to determine whether the first sub-pixel does not emit light and whether a plurality of second sub-pixels around the first sub-pixel emit light and to adjust an original gamma voltage of the first sub-pixel to generate a target gamma voltage when the first sub-pixel does not emit light and the plurality of second sub-pixels around the first sub-pixel emit light. The target gamma voltage is greater than the original gamma voltage.

Advantageous Effect

According to an embodiment of the present disclosure, a display panel and an electronic device are disclosed. When the first pixel does not emit light and the second pixels around the first pixel emit light, a target gamma voltage is generated by adjusting the original gamma voltage of the first sub-pixel and the target gamma voltage is greater than the original gamma voltage, so as to reduce the voltage difference between anodes/cathodes of the first sub-pixel and the second sub-pixels to reduce the current flowing from the second sub-pixels to the first sub-pixel. In this way, the risk of reducing the brightness of the second sub-pixel is alleviated and the brightness and uniformity of the display panel could be improved.

BRIEF DESCRIPTION OF THE DRAWINGS

In order to more clearly illustrate the technical solution in the embodiment of the present disclosure, the following will be a brief introduction to the drawings required in the description of the embodiment. Obviously, the drawings described below are only some embodiments of the present disclosure, for those skilled in the art, without the premise of creative labor, may also obtain other drawings according to these drawings.

DETAILED DESCRIPTION OF PREFERRED EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

The term "first", "second" are for illustrative purposes only and are not to be construed as indicating or imposing a relative importance or implicitly indicating the number of technical features indicated. Thus, a feature that limited by "first", "second" may expressly or implicitly include at least one of the features. Furthermore, the term "comprising" and "including" will be understood as meaning the inclusion of elements but not the exclusion of any other elements, unless explicitly described to the contrary. For example, a process, method, system, product or device that includes a series of steps or modules is not limited to the listed steps or modules, but optionally also includes steps or modules that are not listed, or optionally also includes other steps or modules inherent to such processes, methods, products or devices.

The term "embodiment" means that a particular feature, structure or characteristic described in connection with the embodiment can be included in at least one embodiment of the present application. The appearances of this phrase in various places in the specification are not necessarily all referring to the same embodiment, nor are separate or alternative embodiments mutually exclusive of other embodiments. Those skilled in the art understand, both explicitly and implicitly, that the embodiments described herein may be combined with other embodiments.

The embodiments of the present application provide a display panel, which may include but is not limited to the following embodiments and combinations of the following embodiments.

Figure 1:
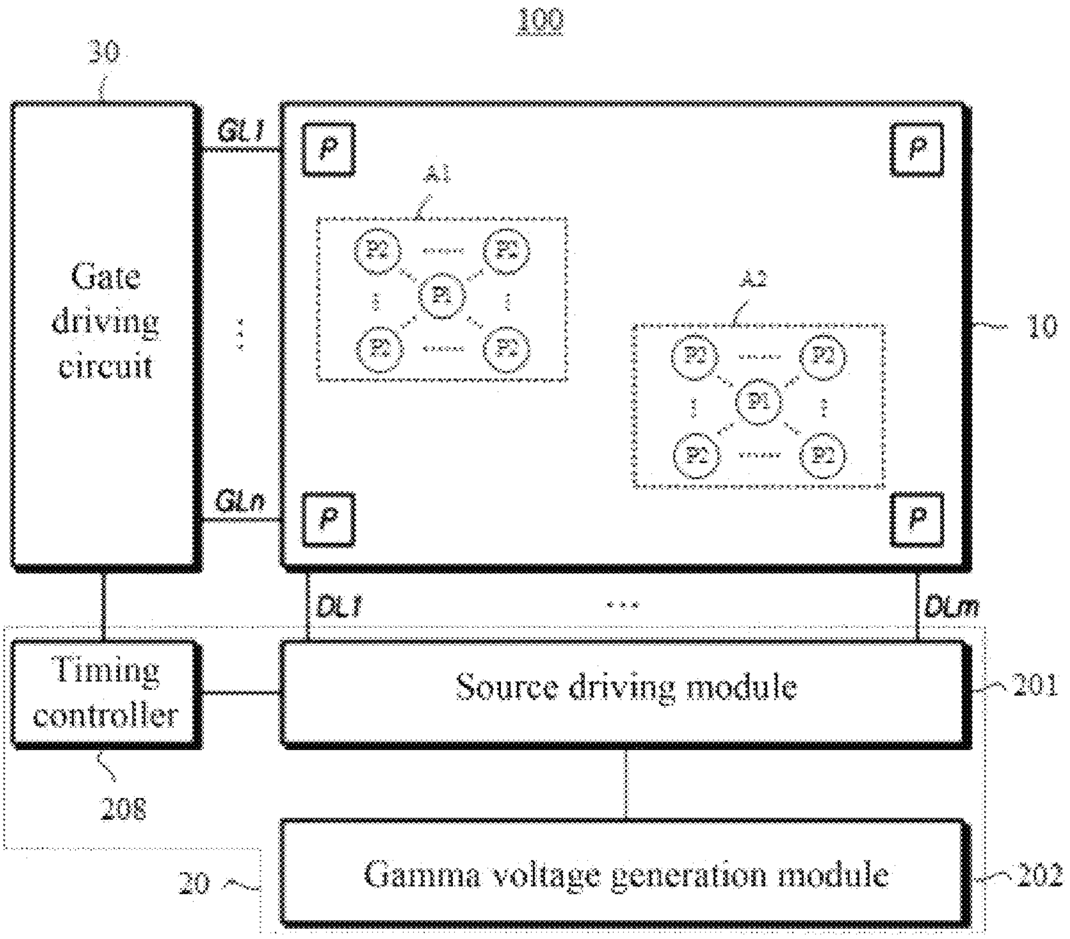
FIG. 1 is a block diagram of a display panel according to an embodiment of the present disclosure.
Figure 2:
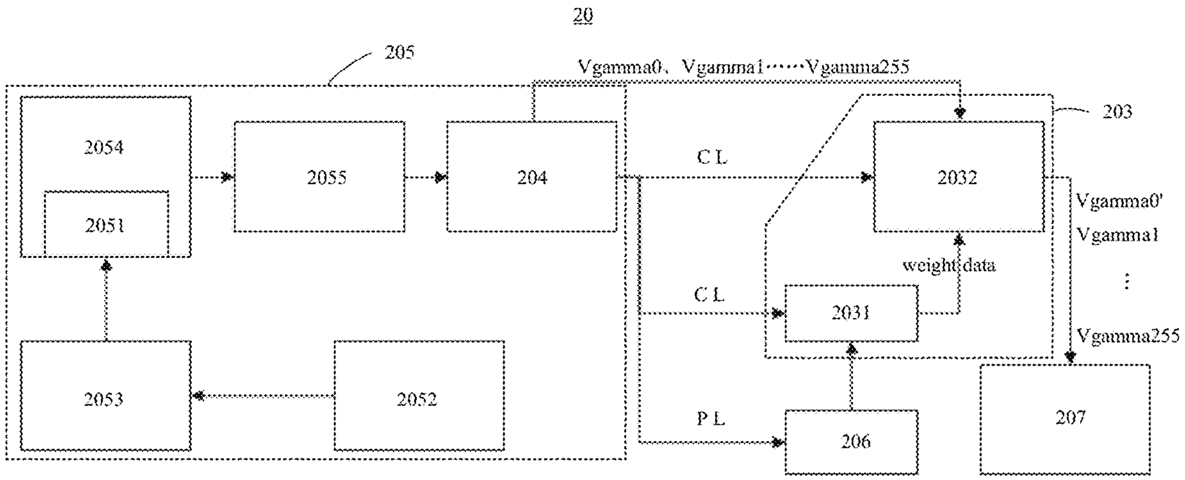
FIG. 2, FIG. 3 and FIG. 6 are block diagrams of three driver chips according to an embodiment of the present disclosure.
Figure 3:
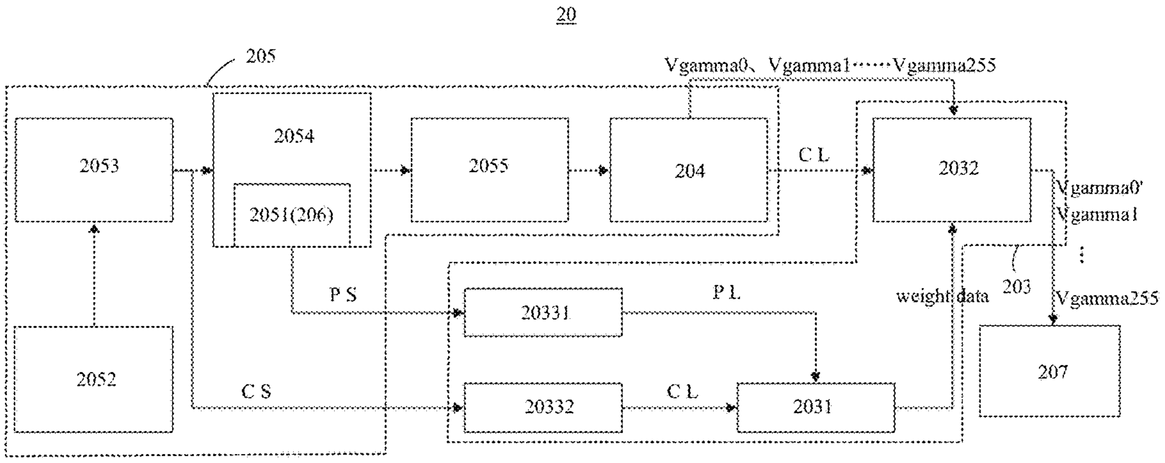

In one embodiment, as illustrated in FIG. 1, the display panel 100 comprises: a panel body 10 and a driver chip 20. The panel body 10 comprises the first sub-pixel P1 (e.g., red R) and the second sub-pixel P2 (e.g., green G) of different colors. The driver chip 20 is electrically connected to the first sub-pixel P1 and the second sub-pixel P2. Here, as shown in FIG. 2 and FIG. 3, the driver chip 20 comprises: an adjusting module 203 configured to determine whether the first sub-pixel P1 does not emit light and whether a plurality of second sub-pixels P2 around the first sub-pixel P1 emit light and to adjust the original gamma voltage VR0 of the first sub-pixel P1 to generate a target gamma voltage VR0' when the first sub-pixel P1 does not emit light and the plurality of second sub-pixels P2 around the first sub-pixel P1 emit light. Here, VR0'>VR0.

For the convenience of illustration, in FIG. 1, only the first region A1 satisfies "the first sub-pixel P1 does not emit light and a plurality of second sub-pixels P2 around the first sub-pixel P1 emit light", and the second region A2 does not satisfy "the first sub-pixel P1 does not emit light and the plurality of second sub-pixels P2 around the first sub-pixel P1 emit light". Therefore, the original gamma voltage VR0 of the first sub-pixel P1 in the first region A1 can be adjusted to generate a larger target gamma voltage VR0', while the original gamma voltage VR of the first sub-pixel P1 in the second region A2 can be maintained as the original value. Here, please note that the present disclosure does not limit the specific position and size of the first region A1 and the second region A2 that meet the above requirements respectively. Furthermore, at a specific time, the first region A1 or the second region A2 that meet the above requirements can also be included. This is for illustrating that the driver chip 20 has the above driving function.

In this embodiment, the display panel may be, but not limited to, a self-light emitting display panel, such as an OLED display panel. The first sub-pixel P1 and the second sub-pixel P2 can be manufactured by, but not limited to, printing or evaporation processes. Due to the limit of the process accuracy, the adjacent first sub-pixel P1 and the second sub-pixel P2 may contact each other to form a leakage path. When the voltage difference of the anodes/cathodes of the first sub-pixel and the second sub-pixel exists, the leakage path also has a certain resistance value so that a leakage current flows from an anode/cathode of a sub-pixel having a higher voltage level to another anode/cathode of another sub-pixel having a lower voltage level. In this way, the current value of the first sub-pixel P1 or the second sub-pixel P2 having a higher voltage level reduces and thus the brightness of that sub-pixel.

For illustration, here, the anodes of the first sub-pixel P1 or the second sub-pixel P2 are supplied with certain voltage levels and the cathodes of the two sub-pixels are grounded as an example. When the voltage level of the anode of the second sub-pixel P2 is higher than the voltage level of the anode of the first sub-pixel P1, it can be seen from the above analysis that a leakage current flows from the anode of the second sub-pixel P2 to the cathode of the first sub-pixel P1, resulting in a decrease of the current passing through the second sub-pixel P2 and a decrease in the brightness of the second sub-pixel P2. In particular, when the display panel displays a monochrome picture with the color of the second sub-pixel P2, the brightness of the whole picture will be reduced and the color will be dark.

Figure 4:
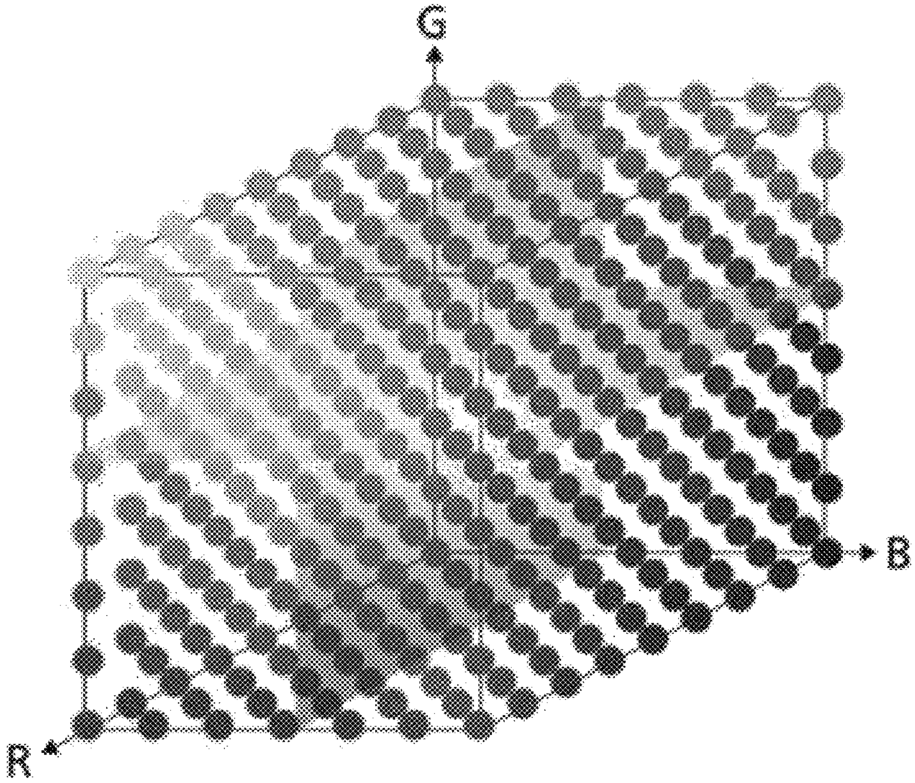
FIG. 4 is a diagram of a 3D LUT according to an embodiment of the present disclosure.

As shown in FIG. 4, the principle of 3D LUT (Look-Up Table) technology is as follows: R, G, B (red, green, blue) three 1D LUTs form a 3D LUT, and the input gray values of R, G, B channels (i.e., the values of the R-axis, G-axis, and B-axis in the figure) are mapped according to the three lookup tables of the 3D LUT to obtain the converted color (that is, the color of each coordinate in the figure, which is actually multicolor). In view of the above issue, for example, the first sub-pixel P1 and the second sub-pixel P2 are R sub-pixel and G sub-pixel respectively. Based on the 3D LUT technology, the voltage difference between the anode of the R sub-pixel and the anode of the G sub-pixel is reduced by raising the data voltage of the R sub-pixel. That is, the color of R=0 in the 3D LUT is replaced with the color of R=1, so that the effect of 1 gray scale can be displayed by the input of 0 gray scale of R sub-pixel to alleviate the display effect caused by the leakage current.

However, because the set points of the 3D LUT architecture is n*n*n, that means that the N (greater than n, for example, equal to 256) gray values of R/G/B can only be divided into (n−1) intervals, and the colors corresponding to the remaining gray values are determined by interpolation. The disadvantage of the above method is that when the color R=0 in the 3D LUT is replaced with the color R=1, the color when R is equal to another gray scale values will change such that the original color effect of the 3D LUT cannot be realized.

Figure 5:
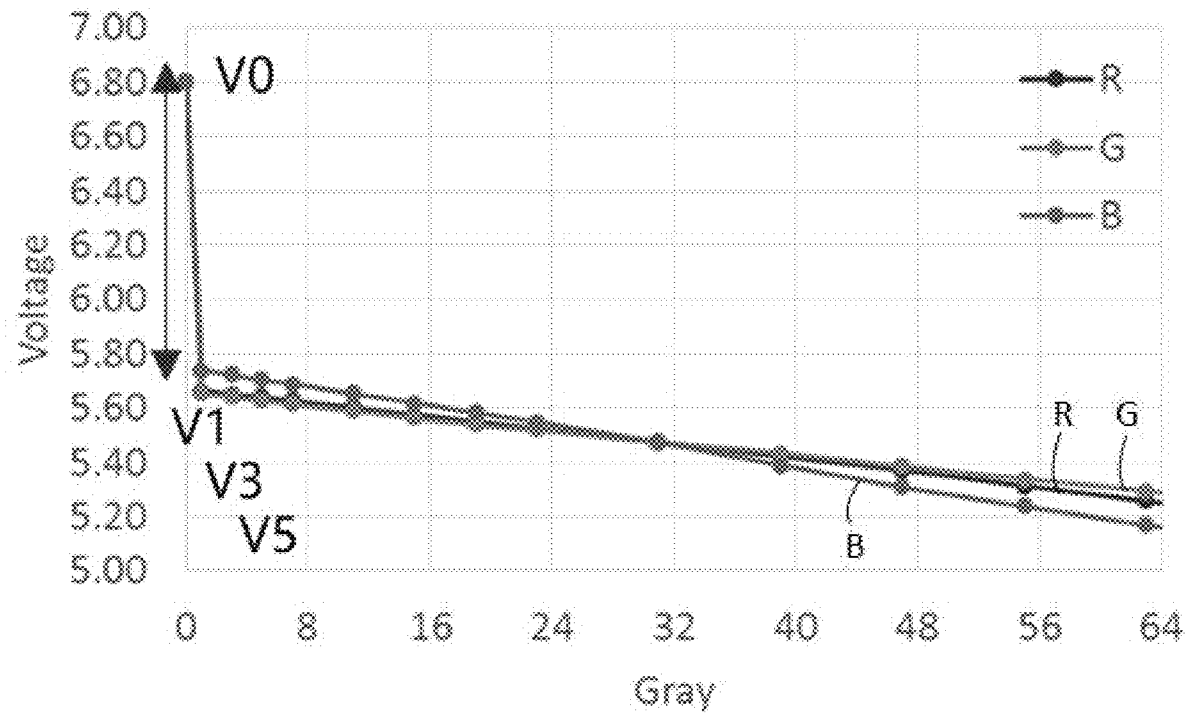
FIG. 5 is a gray scale-voltage curve of R sub-pixel, G sub-pixel and B sub-pixel according to an embodiment of the present disclosure.

As shown in FIG. 5, the gray values-voltage curves of the R sub-pixel, G sub-pixel and B sub-pixel are displayed. The abscissa Gray and ordinate Voltage represent the gray value and the corresponding gamma voltage of the sub-pixel, respectively. It should be noted that the gamma voltage V0 corresponding to the gray value 0 of each sub-pixel is generally set to reduce the risk of brightness reduction, so the difference between the gamma voltage value V1 corresponding to the gray value 1 and the gamma voltage value V0 corresponding to the gray value 0 is set as being large. This will cause a large difference between the gamma voltage corresponding to the gray value 0 of the R sub-pixel and the gamma voltage corresponding to the non-0 gray value of the G sub-pixel (such as, but not limited to, the gamma voltage value V3 corresponding to the gray value of 3, and the gamma voltage value V5 corresponding to the gray value of 5), resulting in the aggravation of the above-mentioned leakage current. Please refer to FIG. 5 again, it can also be seen that if the gamma voltage corresponding to the gray value 0 of the R sub-pixel is directly set to equal to the gamma voltage corresponding to the gray value 1, the risk of the brightness reduction of the R sub-pixel will increase. Therefore, in this disclosure, the voltage V0 of the R sub-pixel is set to be close to the V1 level to improve the lateral leakage current and the risk of brightness reduction.

Figure 6:
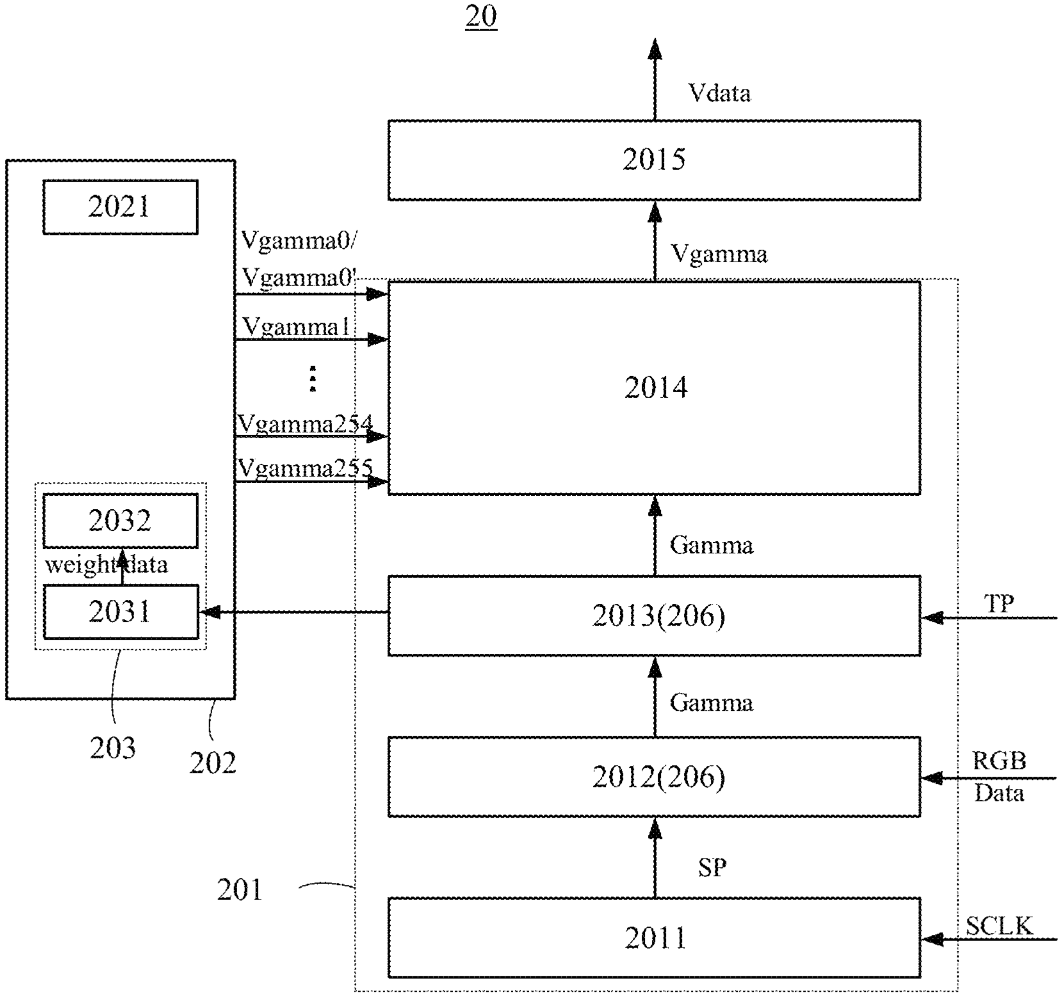

Please refer to FIG. 1 and FIG. 6, the driver chip 20 may comprise a source driving module 201 electrically connected to the panel body 10, a gamma voltage generation module 202 electrically connected to the source driving module 201. The source driving module 201 may include a shift register 2011 receiving a source sampling clock signal SCLK, a first latch 2012 receiving an image data RGB Data and electrically connected to the shift register 2011, a second latch 2013 receiving a data latch signal TP and electrically connected to the first latch 2012, a digital-to-analog converter 2014 electrically connected to the second latch 2013, and a buffer amplifier 2015 electrically connected to the digital-to-analog converter 2014.

As shown in FIG. 1, the panel body 10 may comprise a plurality of sub-pixels P (including but not limited to a plurality of first sub-pixels P1, a plurality of second sub-pixels P2), a plurality of gate lines (GL1-GLn) and a plurality of data lines (DL1-DLm). Here, for illustration, the plurality of sub-pixels P are arranged along the row direction and column direction (for example, the sub-pixels P could be arranged in n rows and m columns, where m and n are positive integers). Furthermore, each gate line (each of GL1-GLn) is connected between the gate driving circuit 30 and a plurality of sub-pixel P of the corresponding row, and each data line (each of DL1-DLm) is connected between the source driving module 201 and a plurality of sub-pixels P of the corresponding column. The plurality of gate signals transmitted by a plurality of gate lines (GL1-GLn) can sequentially turn on the sub-pixels P line by line, and the data lines (DL1-DLm) could transmit the data signal with multiple data voltages Vdata corresponding to the sub-pixels P. In this way, when the corresponding sub-pixels P are turned on, the corresponding data voltage Vdata can be loaded into the corresponding sub-pixels P.

Further, the gate driving circuit 30 can be integrated in the driver chip 20 or in the panel body 10. Or, it can also be arranged independently of the driver chip 20 and the panel body 10 as shown in FIG. 1 to form a separate chip.

As shown in FIG. 6, the shift register 2011 can generate a sampling signal SP to the first latch based on the source sampling clock signal SCLK. The first latch 2012 samples the image data RGB data according to the sampling signal SP to obtain a plurality of gray values Gamma (consisting of multi-bit binary numbers) corresponding to a plurality of sub-pixels located in the same row and transmits the gray values to the digital-to-analog converter 2014 after passing through the latch of itself and the second latch 2013 in turn. The gamma voltage generation module 202 can generate multiple gamma voltages Vgamma corresponding to multiple gray values (e.g., when the gray values include 256 grayscale values Gamma0 Gamma255, the corresponding 256 gamma voltages includes Vgamma0-Vgamma255). Therefore, the digital-to-analog converter 2014 can output the corresponding gamma voltage Vgamma according to the gray value Gamma corresponding to each sub-pixel based on a plurality of gamma voltages and output the corresponding data voltage Vdata of the sub-pixel through the buffer amplifier 2015 to the corresponding sub-pixel through the corresponding data line.

Based on the above discussion, it can be seen that the amplitude of the gamma voltages Vgamma can determine the amplitude of the data voltage corresponding to each gray value. Therefore, under any gray value Gamma, the corresponding data voltage Vdata of the sub-pixel can be generated by setting the gamma voltage Vgamma, so as to control the brightness of the sub-pixel.

Please refer to FIG. 1 and FIG. 6. Theoretically, when the first sub-pixel P1 in the first region A1 does not emit light (i.e., the gray scale value is Gamma0), the corresponding gamma voltage should be Vgamma0 (i.e., the original gamma voltage VR0). The difference is that, in this embodiment, considering that a plurality of second sub-pixels P2 around the first sub-pixel P1 in the first region A1 emit light, the original gamma voltage VR0 of the first sub-pixel P1 is adjusted to generate a higher target gamma voltage VR0', so that the gamma voltage corresponding to the gray value Gamma0 at this time can be regarded as Vgamma0'.

It is understood that, in this embodiment, the original gamma voltage VR0 of the first sub-pixel P1 in the first region A1 is adjusted to generate a higher target gamma voltage VR0', so that the difference between the anode/cathode of the first sub-pixel P1 in the first region A1 and the surrounding anodes/cathodes of the plurality of second sub-pixels P2 that emit light is small. Thus, the current flowing into the anode/cathode of the first sub-pixel P1 through the leakage path becomes smaller, so as to reduce the loss of the current flowing through the second sub-pixels P2 and thus reduce the risk of brightness reduction of the second sub-pixels P2.

It is noted that, for the first region A1, since the above situation is not satisfied, (that is, the voltage difference between the anodes/cathodes of the two sub-pixels can be considered to be close), the above adjustment is not required to further reduce the voltage difference between the anodes/cathodes of the two sub-pixels.

Furthermore, please refer to FIG. 2, FIG. 3 and FIG. 6. The adjustment module 203 can have the effect of "adjusting the original gamma voltage VR0 of the first sub-pixel to generate the target gamma voltage VR0'". That is, the adjustment module 203 can be used to generate Vgamma0' corresponding to the first sub-pixel P1 in a specific case. Therefore, the adjustment module 203 can be located in the gamma voltage generation module 202.

In one embodiment, the adjustment module 203 comprises an analysis and calculation module 2031 and a data conversion module 2032. The analysis and calculation module is configured to determine whether the first sub-pixel P1 does not emit light and whether the plurality of second sub-pixels P2 around the first sub-pixel P1 emit light, and is further configured to generate weight data of the plurality of second sub-pixels P2 around the first sub-pixel P1 when the first sub-pixel P1 does not emit light and the plurality of second sub-pixels P2 around the first sub-pixel P1 emit light The data conversion module 2032 is configured to adjust the original gamma voltage VR0 according to the weight data to generate the target gamma voltage VR0'.

Specifically, the analysis and calculation module 2031 is configured to generate the weight data according to the number of the second sub-pixels P2 that emit light or the average gray value.

It is understood that in the present disclosure, the target gamma voltage VR0' of the first sub-pixel P1 according to the brightness of a plurality of second sub-pixels P2 that emit light from the periphery of the first sub-pixel P1 in the first region A1. For example, when the brightness of the second sub-pixels P2 that emit light (i.e., the number of emitting second sub-pixels P2 or the total gray value) is greater, if no improvement is made, the voltage difference of the anodes/cathodes of the second sub-pixel P2 that emit light and the anode/cathode of the first sub-pixel P1 that emits light is greater. This results in a serious leakage current issue (the direction of the leakage current can refer to the arrow in FIG. 7). Therefore, in the present disclosure, the original gamma voltage VR0 of the first sub-pixel P1 that does not emit light can be adjusted to generate a larger target gamma voltage VR0', so as to reduce the voltage difference and improve the issue of brightness reduction caused by leakage current of the second sub-pixels P2 in the first region A1.

Figure 7:
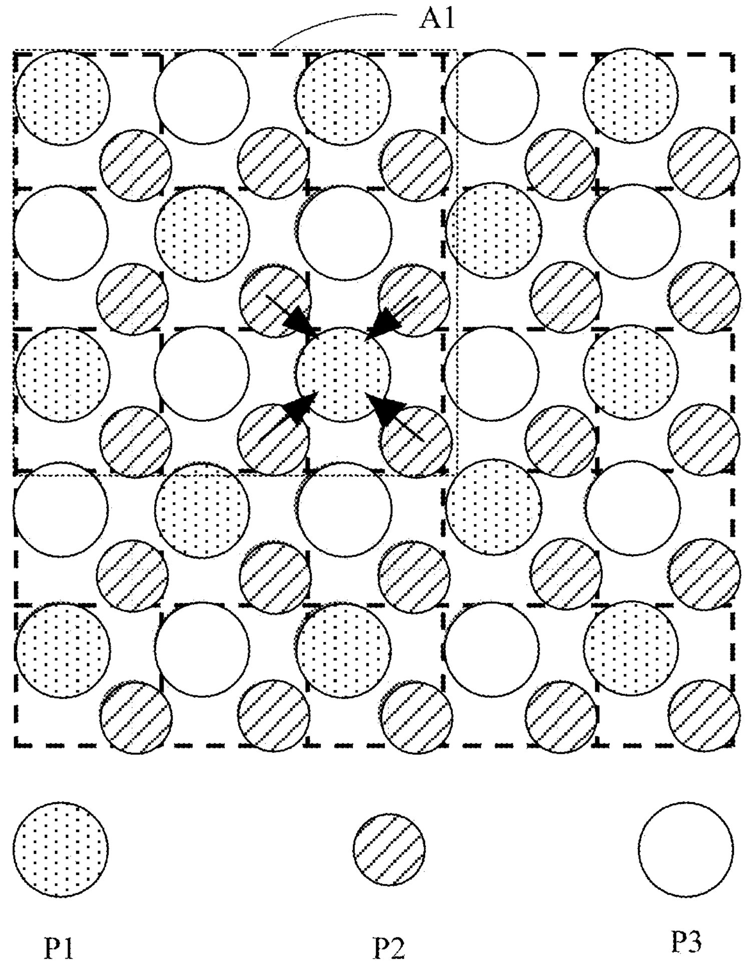
FIG. 7 is a diagram showing an arrangement of a plurality of sub-pixels according to an embodiment of the present disclosure.

It is noted that the division of the first region A1 satisfying the requirements of "the first sub-pixel P1 does not emit light and the plurality of second sub-pixels P2 around the first sub-pixel that emit light may be determined according to the distribution of the multiple first sub-pixels P1 that do not emit light and the surrounding multiple second sub-pixels P2 that emit light. It can be understood as the area where multiple first sub-pixels P1 do not emit light and multiple second sub-pixels that emit light are concentrated. In this way, the calculated target gamma voltage VR0' can be used to compensate for the brightness of this area. For example, as shown in FIG. 7, the region where the first sub-pixel P1 that does not emit light can be determined first, and then a plurality of second sub-pixel P2 that emit light around the periphery of the region can also be determined, so as to form the first region A1.

It is noted that in the present disclosure, there is no limitation on the types of the sub-pixels. The sub-pixels may at least include a plurality of first sub-pixels P1 and a plurality of second sub-pixels P2 with different colors. For example, these sub-pixels can be green and red sub-pixels. In addition, as shown in FIG. 7, a plurality of sub-pixels can also include a plurality of third sub-pixels P3, and the color of the third sub-pixel P3 can be, but not limited to, blue. Similarly, when the green color picture is displayed, a leakage current between the second sub-pixel P2 and the third sub-pixel P3 may also exist. Therefore, when the second sub-pixel P2 emits light, the target gamma voltage corresponding to the gray value 0 corresponding to the third sub-pixels P3 around the second sub-pixel P2 can also be set according to the above method, so as to reduce the leakage current flowing from the second sub-pixels P2 to the third sub-pixel P3 and reduce the risk of the brightness reduction of the second sub-pixel P2.

As discussed above, each sub-pixel has a corresponding gray gray Gamma. With multiple gamma voltages Vgamma, the corresponding data voltage could be generated. The gray value Gamma of the sub-pixel can be a multi-bit binary number. Based on 256 grayscale values (Gamma-Gamma255), each gray value Gamma can be an 8-bit binary number. For example, if the grayscale value Gamma0 is equal to 0, then the gray value is the binary number "00000000". If the grayscale value Gamma8 is equal to 8, the gray value is the binary number "00001000".

Therefore, according to the specific values of multiple gray values, the number and average gray value of the second sub-pixels P2 that emit light in the first region A1 can be determined. Assume that the number of second sub-pixels P2 that emit light in the first region A1 is Cnt and the total gray scale is Gam, the adjustment module 203 can determine the target gamma voltage VR0' (i.e., Vgamma0') corresponding to the first sub-pixel P1 that does not emit light in the first region A1 by, but not limited to, the following two methods:

$$VR0' = Vgamma1 \times Cnt/(m*n) + Vgamma0 \times (1 - Cnt/(m*n)). \quad \text{Formula 1}$$

Here m*n can be the total number of the second sub-pixels P2 in the first region A1. Taking FIG. 7 as an example, based on the arrangement of the second sub-pixels P2 in the first region A1 along the row direction and column direction, it can be considered that m and n are the number of the second sub-pixels P2 in the row direction and the second sub-pixel P2 in the column direction in the first region A1, respectively, and Cnt is the number of the second sub-pixels P2 that emit light in the first region A1. For example, in FIG. 5, m=n=3, Cnt=4 (i.e., four of the second sub-pixels with arrows), then Cnt/(m*n)=4/9, then VR0'=(4/9)*Vgamma1+(5/9)*Vgamma0. Here, "Cnt/(m*n)" can be understood as the above-mentioned weight.

In formula 1, the target gamma voltage VR0' corresponding to the first sub-pixel P1 that does not emit light in the first region A1 is determined by calculating the proportion of the second sub-pixels P2 that emit light in the first region A1 to all the second sub-pixels P2 in the first region A1. For example, if Cnt/(m*n) is greater, it means that the proportion of the second sub-pixels P2 that emit light in the first region A1 is greater and the leakage current paths are more. Therefore, the voltage difference between the anode/cathode of the first sub-pixel P1 that does not emit light in the first region A1 and the anodes/cathodes of the second sub-pixels P2 that emit light needs to be further reduced. Indeed, in method 1, when Cnt/(m*n) is greater, target gamma voltage VR0' is adjusted to be closer to Vgamma1 instead of Vgamma0, so the brightness of the second sub-pixels P2 that emit light in the first region A1 can be improved.

$$VG10 = Vgamma1 \times avg(Gam)/Gammax + Vgamma0 \times (1 - avg(Gam)/Gammax). \quad \text{Formula 2}$$

Here, avg(Gam) is the average gray value, which is obtained by diving the total gray value Gam, obtained by adding the gray values Gamma of all the second sub-pixels P2 that emit light in the first region A1, by the number Cnt of second sub-pixels P2 that emit light in the first region A1. That is, avg(Gam) is the average gray value of all (luminous) second sub-pixels P2 in the first region A1, which can be used to measure the gray value of each second sub-pixel P2 in the first region A1. Gammax represents the maximum gray value. For example, if there are 256 gray values Gamma0-Gamma255, which are equal to 0, 1 . . . and 255, then Gammax is equal to 255. Here, "avg(Gam)/Gammax" can be understood as the above-mentioned weight.

It is understood that in formula 2, the target gamma voltage VR0' corresponding to the non-emitting first sub-pixel P1 in the first region A1 is determined by calculating the proportion of the average gray scale of all (emitting) second sub-pixels in the first region A1 to the maximum value of the gray scale value, such as avg(gam)/The larger the Gammax, that is, the higher the average brightness of the second sub-pixel P2 that emits light in the first region A1, the more ways in which transverse leakage occurs, and the difference between the voltage value of the anode or cathode of the non-emitting first sub-pixel P1 in the first region A1 and the voltage value of the anode or cathode of the second sub-pixel P2 that emits light is further reduced, and the avg(Gam)/ in method 2 is indeed in the first region The larger the Gammax, the closer VG10 is to Vgamma1 and farther away from Vgamma0, so the brightness of the second sub-pixel P2 that emits light in the first region A1 can be improved.

It is noted that either in Formula 1 or Formula 2, the number Cnt of the second sub-pixels P2 that emit light within the first region A1 or the average gray value avg (Gam) are correlated to the way how the first region A1 is defined. Correspondingly, the calculated target gamma voltage VR0' corresponding to the first sub-pixel P1 that does not emit light in the first region A1 should be applied to the first sub-pixel P1 that does not emit light in the first region A1. That is, the target gamma voltage VR0' should correspond to the first region A1.

Compared with Formula 1, Formula 2 not only takes into account the number Cnt of the second sub-pixels P2 that emit light in the first region A1, but also the gray value Gamma of each of the second sub-pixels P2 that emit light in the first region A1. Furthermore, the average gray value avg (Gam) can be used to more accurately evaluate the brightness of the second sub-pixels P2 that emit light in the first region A1, and the target gamma voltage VR0' corresponding to the first sub-pixel P1 that does not emit light in the first region A1 can also used to accurately control the multiple data voltages applied to the corresponding sub-pixels. In this way, the issue of brightness reduction of the light-emitting sub-pixels (the second sub-pixels P2) in the first region A1 could be alleviated.

In the above Formula 1, since the target gamma voltage VR0' corresponding to the first sub-pixel P1 that does not emit light is calculated according to the proportion of the number of the second sub-pixels P2 that emit light in the first region A1, a quantity threshold can be set and the steps of generating the weight data and the target gamma voltage VR0' can be performed only when the number of the second sub-pixels P2 that emits light in the first region A1 is greater than the quantity threshold. Otherwise (i.e., the leakage current is not serious), there is no need to generate the target gamma voltage VR0' (i.e. maintain an unregulated raw gamma voltage VR0).

Figure 8:
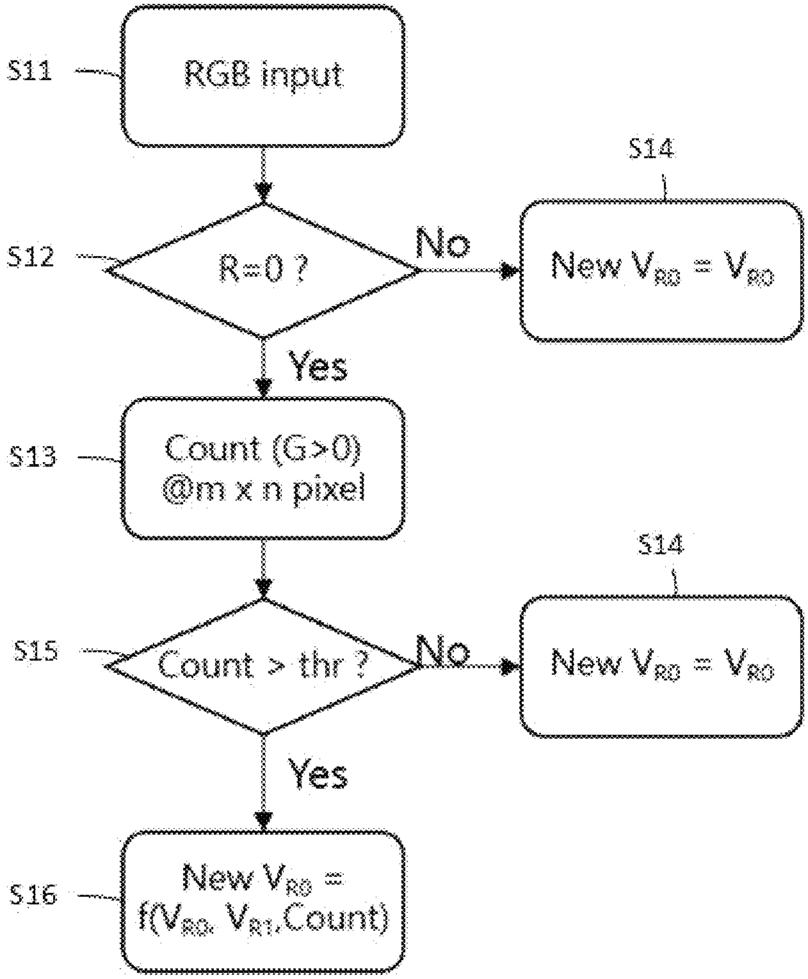
FIG. 8 is a flow chart of a method 1 according to an embodiment of the present disclosure.

As discussed above, with reference to FIG. 8, Formula 1 can include, but not limited to, the following steps:

Step S11: RGB input. That is, the gray value of each first sub-pixel P1, the gray value of each second sub-pixel P2, and the gray value of each third sub-pixel P3 in the first region A1 are obtained. Here, the first region A1 may include m*n sub-pixels.

Step S12: R=0? That is, it is determined whether there is at least one first sub-pixel P1 with a gray value equal to 0.

If yes, then go to Step S13.

Step S13: Count (G>0) @m×n pixel. That is, S13 obtains the number Count of second (G) sub-pixels P2 that emit light in the first region A1 including m*n sub-pixels (i.e., the above-mentioned Cnt), where "emitting light" can be understood as the gray value of the corresponding second (G) sub-pixel P2 (i.e., the first gray scale value) is greater than 0.

If not, it means that the gray scale value of each first sub-pixels P1 is greater than 0 and then go to Step S14.

Step S14: New VR0=VR0. That is, the target gamma voltage VR0' (i.e., New VR0) corresponding to the first sub-pixel when the gray scale value is 0 is set to be equal to the original gamma voltage VR0 (i.e., corresponding to Vgamma0).

After S13, method 1 further comprises:

Step S15: Count>thr? That is, S15 determines whether the number of second sub-pixels P2 that emit light in the first region A1 is greater than the quantity threshold (i.e., thr).

If yes, then go to S16.

Step S16: New VR0=f (VR0, VR1, Count). That is, the target gamma voltage VR0' (i.e., New VR0) corresponding to the first sub-pixel P1 when the gray value is 0 is set according to the original gamma voltage VR0 (i.e., Vgamma0), VR1 (i.e., Vgamma1), Count (i.e., the above Cnt). Specifically, the target gamma voltage VR0' can be determined by the following equation:

$$Vgamma1 \times Cnt/(m*n) + Vgamma0 \times (1 - Cnt/(m*n)).$$

If not, then go to S14.

In method 2, since the target gamma voltage VR0' is calculated according to the proportion of the average gray value of the second sub-pixels P2 that emit light in the first region A1 to the maximum gray value. an average value threshold can be set and the steps of generating the target gamma voltage VR0' can be performed only when the average gray value of the second sub-pixels P2 that emit light in the first region A1 is greater than the average value threshold. Otherwise (i.e., the leakage current is not serious), there is no need to generate a target gamma voltage VR0' (i.e. maintain an unregulated raw gamma voltage VR0).

Figure 9:
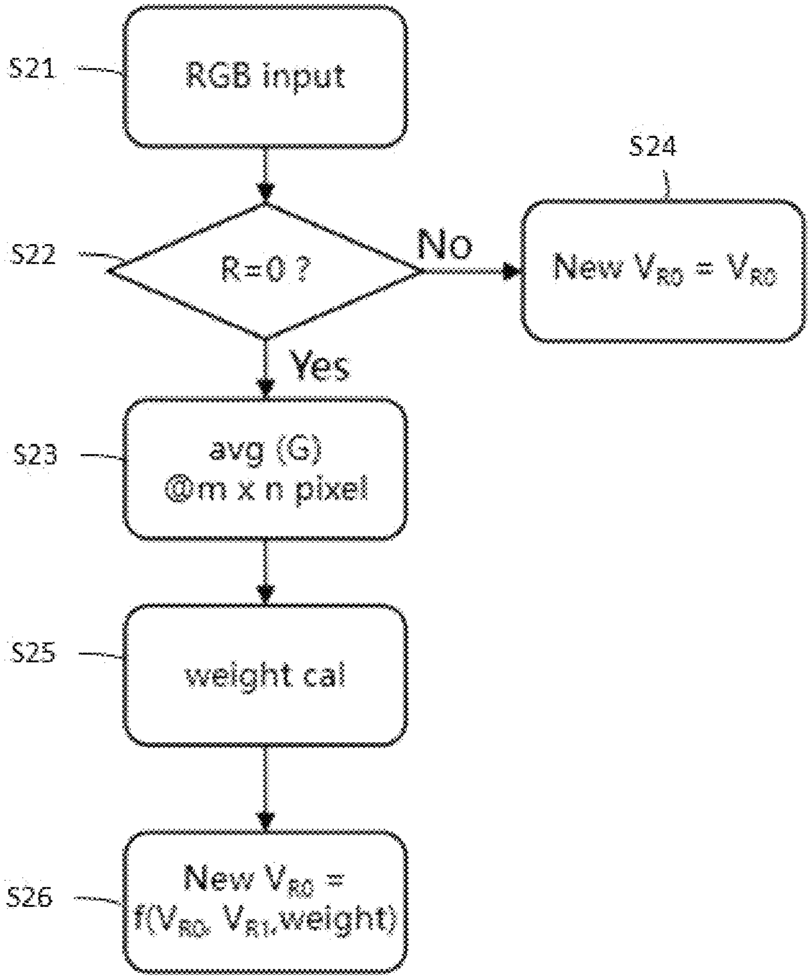
FIG. 9 is a flow chart of a method 2 according to an embodiment of the present disclosure.

As discussed above, referring to FIG. 9, method 2 can include, but not limited to, the following steps:

Step S21: RGB input. That is, S21 obtains the gray value of each first sub-pixel P1, the gray value of each second sub-pixel P2, and the gray value of each third sub-pixel P3 in the first region A1. Here, the first region A1 may include m*n sub-pixels.

Step S22: R=0? That is, it is determined whether there is at least one first sub-pixel P1 with a gray value equal to 0.

If yes, then go to Step S13.

Step S23: avg (G>0) @m×n pixel. That is, S23 obtains the average grayscale avg of the second (G) sub-pixels P2 that emit light in the first region A1 including m*n sub-pixels (i.e., the above-mentioned avg(Gam)), where "emitting light" can be understood as the gray value of the corresponding second (G) sub-pixel P2 (i.e., the first gray scale value) is greater than 0.

If not, it means that the gray scale value of each first sub-pixels P1 is greater than 0 and then go to Step S14.

Step S24: New VR0=VR0. That is, the target gamma voltage VR0' (i.e., New VR0) corresponding to the first sub-pixel when the gray scale value is 0 is set to be equal to the original gamma voltage VR0 (i.e., corresponding to Vgamma0).

After S23, method 2 further comprises:

Step S25: weight cal. That is, S25 determines the weight of the average grayscale avg of the second sub-pixels P2 that emit light in the first region A1, which can be avg(Gam)/Gammax. Here, Gammax is the maximum gray value.

Step S26: New VR0=f (VR0, VR1, weight). That is, the target gamma voltage VR0' (i.e., New VR0) corresponding to the first sub-pixel P1 when the gray value is 0 is set according to the original gamma voltage VR0 (i.e., Vgamma0), VR1 (i.e., Vgamma1), weight (i.e., the avg (Gam)/Gammax). Specifically, the target gamma voltage VR0' can be determined by the following equation:

$$VG10 = Vgamma1 \times avg(Gam)/Gammax + Vgamma0 \times (1 - avg(Gam)/Gammax).$$

In one embodiment, as shown in FIG. 2, FIG. 3 and FIG. 6, the driver chip 20 comprises a memory module 206 (also equivalent to the first latch 2051 in FIG. 3 and the first latch 2012 and the second latch 2013 in FIG. 6). The memory module 206 is configured to store the second gray values of the second sub-pixels P2. As shown in FIG. 2 and FIG. 3, the adjustment module 203 (specifically the analysis and calculation module 2031 therein) is further used to determine whether the second sub-pixels P2 around the first sub-pixel P1 emits light according to the second gray scale values.

Specifically, as shown in FIG. 2, the storage module 206 comprises a row storage module (not shown), and the adjustment module 203 is configured to obtain a plurality of second gray values corresponding to the plurality of second sub-pixels P2 of a previous row of the first sub-pixel P2 from the row storage module (in the storage module 206 or equivalent to the storage module 206). The driver chip 20 further comprises an image processing module 205. The adjustment module 203 is further configured to obtain a plurality of second gray values corresponding to the first sub-pixel P1 of the current row from the image processing module 205. Here, the row storage module is configured to sequentially obtain a plurality of second gray values corresponding to a plurality of second sub-pixels P2 in multiple rows from the image processing module 205.

Especially, although there is no image processing module in FIG. 6, the module "used for obtaining a plurality of second gray values corresponding to the second sub-pixels P2 of the current row of the first sub-pixel P1 from the image processing module 205" shown in FIG. 2 may be the first latch 2012 in FIG. 6, and the row storage module (in the storage module 206 or equivalent to the storage module 206) in FIG. 2 or the second latch 2013 in FIG. 6.

As illustrated in FIG. 6, the first latch 2012 and the second latch 2013 can respectively transmit a plurality of gray values Gamma of the corresponding row of sub-pixels to the adjustment module 203 in the gamma voltage generation module 202. In FIG. 2, the row storage module (in the storage module 206, or equivalent to the storage module 206) and the image processing module 205 can respectively transmit a plurality of gray values Gamma of the corresponding row of the sub-pixels to the adjustment module 203 in the gamma voltage generation module 202. Further, the gray values Gamma of each row of sub-pixels can be read by the analysis and calculation module 2031 in the adjustment module 203, and the weight data is generated when "the first sub-pixel P1 does not emit light and the plurality of second sub-pixels P2 around the first sub-pixel P1 emit light", and then the data conversion module 2032 generates the target gamma voltage VR0' of the first sub-pixel P1 according to the weight data.

Furthermore, the image processing module 205 may be located at the front end of the row storage module (storage module 206) to output a plurality of second gray values corresponding to the second sub-pixels P2 of multiple rows to the row storage module. For example, when the row storage module outputs a plurality of second gray values corresponding to the second sub-pixels P2 of the previous row to the adjustment module 203, the image processing module 205 can simultaneously output a plurality of second gray values corresponding to the second sub-pixels P2 to the row storage module and the adjustment module 203.

According to the embodiment shown in FIG. 2, the image processing module 205 is configured to obtain an image signal and process the image signal to generate a target image signal to the adjustment module 203. The adjusting module 203 is configured to determine the first gray value of the first sub-pixel P1 according to the target image signal, and determine whether the first sub-pixel P1 does not emit light according to the first gray value.

From the above, it can be understood that the target image signal generated by the image processing module 205 can include a plurality of first gray values corresponding to a plurality of first sub-pixels P1 and a plurality of second gray values corresponding to a plurality of second sub-pixels, so that the adjustment module 203 can directly obtain the first gray values of the current first sub-pixel P1 from the target image signal outputted by the image processing module 205 to determine whether the first sub-pixel P1 does not emit light.

In one embodiment, as shown in FIG. 3, the storage module 206 comprises a row storage module. The driver chip 20 comprises: an image processing module 205 and an adjustment module 203. The image processing module 205 comprises a row storage module (in the storage module 206 or equivalent to a storage module 206). The adjustment module 203 is configured to obtain a plurality of second gray values corresponding to the second sub-pixels P2 of the previous row of the first sub-pixel P1 from the row storage module. The image processing module 205 comprises an image enhancement module 2053. The adjustment module 203 is configured to obtain a plurality of second gray values corresponding to the second sub-pixels of the current row of the first sub-pixel P1 from the image enhancement module 2053. Here, the row storage module is configured to sequentially obtain the second gray values corresponding to the second sub-pixels of multiple rows from the image enhancement module 2053.

Specifically, the difference between the embodiment shown in FIG. 3 and the embodiment shown in FIG. 2 is: the row storage module (in the storage module 206 or equivalent to the storage module 206) for outputting a plurality of gray values to the adjustment module 203 in FIG. 3 is included in the image enhancement module 2053 of the image processing module 205, and is independent from the image processing module 205. In addition, the image enhancement module 2053 is located at the front end of the row storage module (in the storage module 206, or equivalent to the storage module 206), and is used to output multiple gray values corresponding to sub-pixels of multiple rows to the row storage module in turn.

It is noted that because the image enhancement module 2053 sequentially outputs a plurality of gray values corresponding to the sub-pixels of multiple row to the row storage module, when the row storage module outputs a plurality of second gray values corresponding to the plurality of second sub-pixels P2 of the previous row to the adjustment module 203, the image enhancement module 2053 also outputs a plurality of second gray values corresponding to the plurality of second sub-pixels P2 of the current row to the row storage module and the adjustment module 203.

Furthermore, in the embodiment shown in FIG. 3, the image processing module 205 is configured to obtain an image signal and process the image signal to generate an enhanced image signal through the image enhancement module 2053 the adjustment module 203. The adjustment module 203 is configured to determine the first gray value of the first sub-pixel P1 according to the enhanced image signal and determine whether the first sub-pixel P1 does not emit light according to the first gray value.

From the above, the enhanced image signal generated by the image enhancement module 2053 may comprise a plurality of first gray values corresponding to a plurality of first sub-pixels P1 and a plurality of second gray scale values corresponding to a plurality of second sub-pixels, so that the adjustment module 203 can directly obtain the first gray value of the current first sub-pixel P1 from the enhanced image signal outputted by the image enhancement module 2053 to determine whether the first sub-pixel P1 does not emit light.

It is noted that in different embodiments, although the signals comprising the first gray value and the second scale value are different, these signals can directly or indirectly include the first gray scale value and the second gray scale value, and the first gray scale value and the second gray scale value can be obtained by corresponding processes.

Especially, in any of the embodiments shown in FIG. 2 or FIG. 3, based on the description "the image processing module 205 is configured to obtain an image signal and process the image signal to generate a target image signal", it could be understood that:

The image processing module 205 may comprise a data splitting module 2052, an image enhancement module 2053, an image rendering module 2054, an image compensation module 2055 and a digital gamma module 204. The data splitting module 2052 can be configured to obtain the image signal and split different sub-image signals corresponding to the sub-pixels of different colors in the image signal. The image enhancement module 2053, the image rendering module 2054, and the image compensation module 2055 perform different processing operations on the sub-image signals corresponding to the sub-pixels of different colors respectively. The processing order of the image enhancement module 2053, the image rendering module 2054, and the image compensation module 2055 is not limited. The image rendering module 2054 may comprise a memory 2051. The memory 2051 can receive a signal corresponding to a row of sub-pixels generated by the image enhancement module 2053 each time. After the signal of the previous row of sub-pixels is outputted to the image compensation module 2055, the signal corresponding to the current row of sub-pixels generated by the image enhancement module 2053 can be received.

Furthermore, the signal processed through the above operations may include multiple gray values (in binary codes) corresponding to multiple sub-pixels, and the digital gamma module 204 can store gamma curves (which can also be generated by the digital gamma module 204). The abscissa of gamma curve can be gray value, and the ordinate can be brightness value. The gamma curve used to characterize the relationship between the brightness and gray value is regarded as being able to conform to the characteristics of human eye. Based on this, the digital gamma module 204 can also obtain the corresponding brightness value through the mapping of the gamma curve in the processed signal. Simultaneously, the digital gamma module 204 can also generate a plurality of gamma voltages Vgamma corresponding to a plurality of brightness values Vgamma (For example, when 256 gray-scale values Gamma0-Gamma255 are included, the corresponding 256 gamma voltages Vgamma0-Vgamma255 can be included.) Therefore, it can be understood that the digital gamma module 204 inputs at least the brightness value corresponding to each gray scale value and 256 gamma voltages Vgamma0-Vgamma255 to the data conversion module 2032 in the adjustment module 203 (the brightness value group C L corresponding to the sub-pixel of the current row can be outputted each time).

From the above, as shown in FIG. 2 and FIG. 3, the analysis and calculation module 2031 in the adjustment module 203 obtains a plurality of second gray values corresponding to a plurality of second sub-pixels P2 in the previous row of the first sub-pixel P1 from the corresponding storage module 206, and obtains a plurality of second gray values corresponding to the plurality of second sub-pixel P2 and the first gray values of the first sub-pixel P1 in the current row of the first sub-pixel P1 from the image processing module 205. When the first sub-pixel P1 does not emit light and a plurality of second sub-pixels P2 around the first sub-pixel P1 emit light, the data conversion module 2032 in the adjustment module 203 can adjust Vgamma0 (i.e., the original gamma voltage VR0) among the 256 gamma voltages to generate Vgamma0' (i.e., the target gamma voltage VR0'), so that Vgamma0', Vgamma1-Vgamma255 and the brightness value corresponding to each gray value can be outputted to the digital-to-analog conversion module 207.

Furthermore, the digital-to-analog conversion module 207 can output a gamma voltage corresponding to each gray scale based on 256 gamma voltages of Vgamma0', Vgamma1 to Vgamma255 and each gray scale value. In the present disclosure, when the first sub-pixel P1 does not emit light and a plurality of second sub-pixels P2 around the first sub-pixel P1 emit light, the Vgamma0 (i.e., the original gamma voltage VR0') of the first sub-pixel P1 is adjusted according to the light emitting condition of the second sub-pixels around the first sub-pixel P1 to generate Vgamma0' (i.e., the target gamma voltage VR0') so that the voltage difference between the cathode/anode of the first sub-pixel P1 and the cathodes/anodes of the second sub-pixels P2 that emit light from the periphery, so as to reduce the leakage current, thereby reducing the risk of the brightness reduction of the second sub-pixels P2 that emit light around the first sub-pixel P1.

From the above disclosure, it can be seen that in the embodiment shown in FIG. 2, the analysis and calculation module 2031 is set to directly obtain a signal from the digital gamma module 204 that includes the brightness value group CL corresponding to the sub-pixels (of all colors) of the current row (i.e., the second gray values corresponding to a plurality of second sub-pixels P2 corresponding to the current row of the first sub-pixel P1), and indirectly obtains, from the digital gamma module 204 (directly from the storage module 206, which is independently set from the image processing module 205), a signal that comprises the brightness value group PL corresponding to the sub-pixels (of all colors) of the previous row (i.e., a plurality of second gray values corresponding to the sub-pixels P2 corresponding to the previous row of the first sub-pixel P1), so that the analysis and calculation module 2031 generates weight data according to the above signal. Furthermore, the data conversion module 2032 can generate Vgamma0' based on the Vgamma0 and Vgamma1 generated by the digital gamma module 204 and the weight data generated by the analysis and calculation module 2031.

It is noted that in the embodiment shown in FIG. 3, although the memory 2051 located in the image rendering module 2054 is reused as the storage module 206 and the storage module 206 shown in FIG. 2 is omitted, it can be seen that the sub-signal C S corresponding to the sub-pixels (of all colors) of the current row outputted by the image enhancement module 2053 and the sub-signal P S corresponding to the sub-pixels (of all colors) of the previous row outputted by the memory 2051 have been processed by the image compensation module 2055 and the digital gamma module 204. For generating corresponding brightness value group, the first data conversion module 20331 can be arranged between the memory 2051 and the analysis and calculation module 2031 to convert the sub-signal P S of the sub-pixels (of all colors) of the previous row to the corresponding brightness value group P L, and a second data conversion module 20332 is arranged between the image enhancement module 2053 and the analysis and calculation module 2031 to convert the sub-signal C S of the sub-pixels (of all colors) of the current line into the corresponding brightness value group C L, so that the analysis and calculation module 2031 can also receive a signal having the brightness value group C L (That is, the signal comprising a plurality of second gray values corresponding to the current row of the first sub-pixel P1, the signal comprising the brightness value group P L corresponding to the sub-pixels (of all colors) of the previous row (i.e., including the plurality of second gray values corresponding to the plurality of second sub-pixels P2 in the previous row of the first sub-pixel P1).

Figure 10:
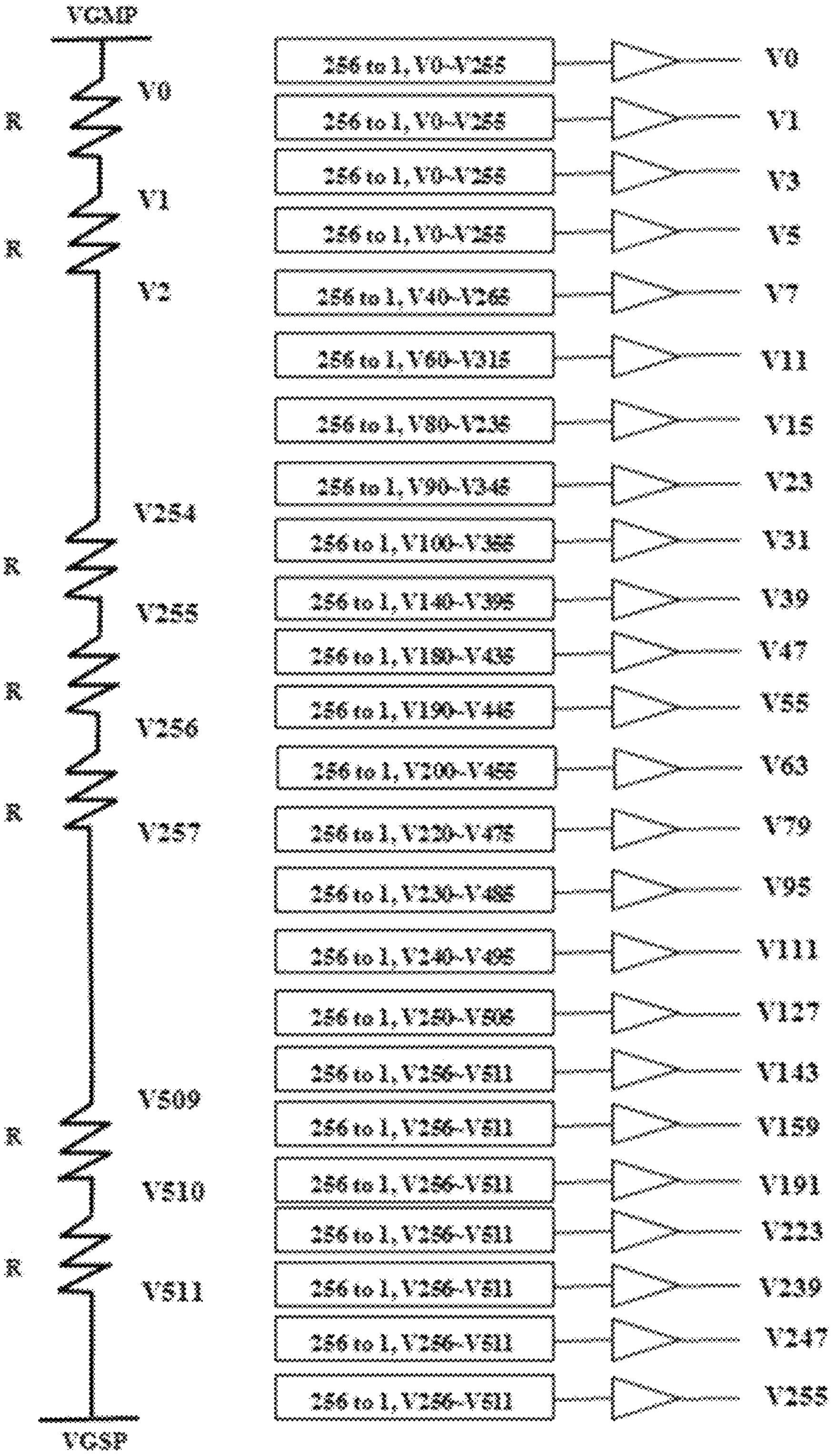
FIG. 10 is a diagram of a register according to an embodiment of the present disclosure.

As illustrated in FIG. 10, both the gamma voltage generation module 202 and the digital gamma module 204 can include a register 2021 and a plurality of series-connected voltage dividing resistors R to generate multiple gamma voltages corresponding to multiple brightness values (and essentially corresponding to multiple gray values). Here, 256 gray scale values Gamma0-256 and gamma voltages Vgamma0-Vgamma255 are used as examples.

Specifically, the two ends of the plurality of voltage dividing resistors R are respectively loaded with a higher first voltage VGMP and a lower second voltage VGSP. By setting the value of the register, the corresponding gamma voltage of a binding point can be determined, and so on. The values of a plurality of registers can be set to output a plurality of binding gamma voltages (for example, V0, V1, V3, V5, V7 . . . . V247, and V255 in FIG. 10). In addition, the gamma voltages at the bonding points are divided by the voltage dividing resistors R to obtain the rest of the gamma voltages by setting the value of the registers, so as to obtain all 256 gamma voltages Vgamma0-Vgamma255.

The formula for each gamma voltage can be as follows:

$$V_{Gray} = VGMP - \frac{VGMP - VGSP}{256} * \text{Register}.$$

Normally, VGMP-6.9V, VGSP=0.5V, and Register is the corresponding register value for adjusting the gamma voltage corresponding to each gray scale value. Here, 0≤Register≤256. The multiple gamma voltages of each color sub-pixel can be adjusted separately to determine. Considering the difference in the brightness efficiency of sub-pixels different colors, the gamma voltage corresponding to the same gray value of sub-pixels of different colors can be different. In this embodiment, the value range of the first voltage VGMP, the second voltage VGSP and the Register is not limited.

According to an embodiment of the present disclosure, an electronic device is disclosed. The electronic device comprises the above-mentioned display panel.

According to an embodiment of the present disclosure, a display panel and an electronic device are disclosed. When the first pixel does not emit light and the second pixels around the first pixel emit light, a target gamma voltage is generated by adjusting the original gamma voltage of the first sub-pixel and the target gamma voltage is greater than the original gamma voltage, so as to reduce the voltage difference between anodes/cathodes of the first sub-pixel and the second sub-pixels to reduce the current flowing from the second sub-pixels to the first sub-pixel. In this way, the risk of reducing the brightness of the second sub-pixel is alleviated and the brightness and uniformity of the display panel could be improved.

The display panel and electronic device provided by the embodiments of the present disclosure are described in detail above. The present disclosure uses specific examples to describe principles and embodiments of the present disclosure. The above description of the embodiments is only for helping to understand solutions of the present disclosure and their core ideas. Furthermore, those skilled in the art may make modifications to the specific embodiments and applications according to ideas of the present invention. In conclusion, the present specification should not be construed as a limitation to the present invention.

What is claimed is:

1. A display panel, comprising:

a panel body, comprising a first sub-pixel and a second sub-pixel of different colors, the first sub-pixel having a first gray value, and the second sub-pixel having a second gray value; and a driver chip, electrically connected to the first sub-pixel and the second sub-pixel, and comprising:

a storage module, configured to store the second gray value of the second sub-pixel;

an adjustment module, configured to determine whether the first sub-pixel does not emit light and whether a plurality of second sub-pixels around the first sub-pixel emit light and to adjust an original gamma voltage of the first sub-pixel to generate a target gamma voltage when the first sub-pixel does not emit light and the plurality of second sub-pixels around the first sub-pixel emit light, wherein the adjustment module comprises:

an analysis and calculation module, configured to determine whether the first sub-pixel does not emit light and whether the plurality of second sub-pixels around the first sub-pixel emits light and to generate a plurality of weight parameters of the second sub-pixels around the first sub-pixel when the first sub-pixel does not emit light and the plurality of second sub-pixels around the first sub-pixel emit light; and a data conversion module, configured to adjust the original gamma voltage to generate the target gamma voltage greater than the original gamma voltage according to the weight parameters;

wherein the adjustment module is further configured to determine whether the second sub-pixels around the first sub-pixel emit light according to the second gray value.

2. The display panel of claim 1, wherein the analysis and calculation module is further configured to generate the weight parameters according to a number of the second sub-pixels that emit light.

3. The display panel of claim 1, wherein the storage module comprises a row storage module, and the adjustment module is further configured to obtain a plurality of second gray values corresponding to the plurality of second sub-pixels of a previous row of the first sub-pixel from the row storage module;

wherein the driver chip further comprises an image processing module, and the adjustment module is further configured to obtain a plurality of second gray values corresponding to the plurality of second sub-pixels of a current row of the first sub-pixel from the image processing module;

wherein the row storage module is configured to sequentially obtain a plurality of second gray values corresponding to a plurality of second sub-pixels of multiple rows from the image processing module.

4. The display panel of claim 3, wherein the image processing module is configured to acquire an image signal and process the image signal to generate a target image signal to the adjustment module;

wherein the adjustment module is configured to determine the first gray value of the first sub-pixel according to the target image signal and determine whether the first sub-pixel does not emit light according to the first gray value.

5. The display panel of claim 1, wherein the storage module comprises a row storage module, and the driver chip comprises:

an image processing module, comprising the row storage module and an image enhancement module, wherein the adjustment module is configured to obtain a plurality of second gray values corresponding to the plurality of second pixels of a previous row of the first sub-pixel from the row storage module and to obtain a plurality of second gray values corresponding to the plurality of second pixels of a current row of the first sub-pixel from the image enhancement module;

wherein the row storage module is configured to sequentially obtain a plurality of second gray values corresponding to a plurality of second sub-pixels of multiple rows from the image enhancement module.

6. The display panel of claim 5, wherein the image processing module is configured to acquire an image signal and utilizes the image enhancement module to process the image signal to generate an enhanced image signal to the adjustment module;

wherein the adjustment module is configured to determine the first gray scale value of the first sub-pixel according to the enhanced image signal and determine whether the first sub-pixel does not emit light according to the first gray value.

7. A display panel, comprising:

a panel body, comprising a first sub-pixel and a second sub-pixel of different colors, the first sub-pixel having a first gray value, and the second sub-pixel having a second gray value; and a driver chip, electrically connected to the first sub-pixel and the second sub-pixel;

wherein the driver chip comprises:

an adjustment module, configured to determine whether the first sub-pixel does not emit light and whether a plurality of second sub-pixels around the first sub-pixel emit light and to adjust an original gamma voltage of the first sub-pixel to generate a target gamma voltage when the first sub-pixel does not emit light and the plurality of second sub-pixels around the first sub-pixel emit light;

wherein the target gamma voltage is greater than the original gamma voltage.

8. The display panel of claim 7, wherein the adjustment module comprises:

an analysis and calculation module, configured to determine whether the first sub-pixel does not emit light and whether the plurality of second sub-pixels around the first sub-pixel emits light and to generate a plurality of weight parameters of the second sub-pixels around the first sub-pixel when the first sub-pixel does not emit light and the plurality of second sub-pixels around the first sub-pixel emit light; and a data conversion module, configured to adjust the original gamma voltage to generate the target gamma voltage according to the weight parameters.

9. The display panel of claim 8, wherein the analysis and calculation module is further configured to generate the weight parameters according to a number of the second sub-pixels that emit light.

10. The display panel of claim 7, wherein the driver chip further comprises:

a storage module, configured to store the second gray value of the second sub-pixel;

wherein the adjustment module is further configured to determine whether the second sub-pixels around the first sub-pixel emit light according to the second gray value.

11. The display panel of claim 10, wherein the storage module comprises a row storage module, and the adjustment module is further configured to obtain a plurality of second gray values corresponding to the plurality of second sub-pixels of a previous row of the first sub-pixel from the row storage module;

wherein the driver chip further comprises an image processing module, and the adjustment module is further configured to obtain a plurality of second gray values corresponding to the plurality of second sub-pixels of a current row of the first sub-pixel from the image processing module;

wherein the row storage module is configured to sequentially obtain a plurality of second gray values corresponding to a plurality of second sub-pixels of multiple rows from the image processing module.

12. The display panel of claim 11, wherein the image processing module is configured to acquire an image signal and process the image signal to generate a target image signal to the adjustment module;

wherein the adjustment module is configured to determine the first gray value of the first sub-pixel according to the target image signal and determine whether the first sub-pixel does not emit light according to the first gray value.

13. The display panel of claim 10, wherein the storage module comprises a row storage module, and the driver chip comprises:

an image processing module, comprising the row storage module and an image enhancement module, wherein the adjustment module is configured to obtain a plurality of second gray values corresponding to the plurality of second pixels of a previous row of the first sub-pixel from the row storage module and to obtain a plurality of second gray values corresponding to the plurality of second pixels of a current row of the first sub-pixel from the image enhancement module;

wherein the row storage module is configured to sequentially obtain a plurality of second gray values corresponding to a plurality of second sub-pixels of multiple rows from the image enhancement module.

14. The display panel of claim 13, wherein the image processing module is configured to acquire an image signal and utilizes the image enhancement module to process the image signal to generate an enhanced image signal to the adjustment module;

wherein the adjustment module is configured to determine the first gray scale value of the first sub-pixel according to the enhanced image signal and determine whether the first sub-pixel does not emit light according to the first gray value.

15. The display panel of claim 8, wherein the driver chip further comprises a storage module, and the storage module is configured to store the second gray values of the plurality of second sub-pixels; and the adjustment module is further configured to determine whether the second sub-pixels around the first sub-pixel emits light according to the second gray scale values.

16. The display panel of claim 9, wherein the driver chip further comprises a storage module, configured to store the second gray value of the second sub-pixel; wherein the adjustment module is configured to determine whether the second sub-pixels around the first sub-pixel emit light according to the second gray values.

17. The display panel of claim 7, wherein the driver chip further comprises a storage module, configured to store the second gray values of the second sub-pixels; wherein the adjustment module is configured to determine whether the second sub-pixels around the first sub-pixel emit light according to the second gray values.

18. An electronic device, comprising the display panel as claimed in claim 1.

19. The display panel of claim 1, wherein the analysis and calculation module is further configured to generate the weight parameters according to an average gray value of the second sub-pixels that emit light.

20. The display panel of claim 8, wherein the analysis and calculation module is further configured to generate the weight parameters according to an average gray value of the second sub-pixels that emit light.

* * * * *